United States Patent
Giles-Brown et al.

(10) Patent No.: US 8,820,453 B2
(45) Date of Patent: Sep. 2, 2014

(54) BUMPER ASSEMBLY

(71) Applicant: Caterpillar S.A.R.L., Geneva (CH)

(72) Inventors: Iain J. Giles-Brown, Tyne & Wear (GB); Ian H. Mearns, Sunderland (GB)

(73) Assignee: Caterpillar SARL, Geneva (CH)

( * ) Notice: Subject to any disclaimer, the term of this patent is extended or adjusted under 35 U.S.C. 154(b) by 8 days.

(21) Appl. No.: 13/690,626

(22) Filed: Nov. 30, 2012

(65) Prior Publication Data
US 2014/0151140 A1    Jun. 5, 2014

(51) Int. Cl.
*B60K 11/04* (2006.01)
*B60R 19/02* (2006.01)

(52) U.S. Cl.
CPC ........................................ *B60R 19/02* (2013.01)
USPC ...................................... 180/68.4; 296/193.09

(58) Field of Classification Search
USPC .............. 180/68.4, 68.6; 296/187.09, 190.01, 296/193.09, 203.02
See application file for complete search history.

(56) References Cited

U.S. PATENT DOCUMENTS

| | | | |
|---|---|---|---|
| 2,551,528 A | | 5/1951 | Darrin |
| 3,423,122 A | | 1/1969 | Wessells, III |
| 4,114,716 A | * | 9/1978 | Sanders ................... 296/190.01 |
| 4,281,733 A | * | 8/1981 | Miller et al. ............... 180/69.21 |
| 5,499,690 A | * | 3/1996 | Shearn et al. ................ 180/68.4 |
| 6,719,075 B2 | | 4/2004 | Kamikawa |
| 6,893,065 B2 | | 5/2005 | Seksaria et al. |
| 6,902,027 B2 | | 6/2005 | Soga et al. |
| 7,815,000 B2 | | 10/2010 | Kisse et al. |
| 7,832,519 B2 | | 11/2010 | Sakamoto et al. |
| 8,613,338 B2 | * | 12/2013 | Rasset et al. ................. 180/68.4 |
| 2008/0246289 A1 | | 10/2008 | Skinner et al. |
| 2009/0033125 A1 | * | 2/2009 | Ayabe et al. ............. 296/187.09 |

OTHER PUBLICATIONS

EJ Articulated Truck article pp. 1-24 © 2011 Caterpillar Inc., www.cat.com.

* cited by examiner

*Primary Examiner* — John Walters
(74) *Attorney, Agent, or Firm* — Finnegan, Henderson, Farabow, Garrett & Dunner, LLP

(57) ABSTRACT

A bumper assembly is disclosed for use with a mobile machine. The bumper assembly may have a heat exchanger, and a bumper configured to support the heat exchanger. The bumper may have a recess formed in an upper surface and located to provide a clearance space around a lower portion of the heat exchanger.

20 Claims, 3 Drawing Sheets

BUMPER ASSEMBLY

TECHNICAL FIELD

The present disclosure relates generally to a bumper assembly and, more particularly, to a bumper assembly for a mobile machine.

BACKGROUND

Machines such as articulated trucks, scrapers, wheel loaders, wheel dozers, motor graders, and wheeled excavators are each equipped with bumpers that help to prevent damage from engagement with worksite obstacles. Conventional bumpers generally take the form of a pressed, hollow, metal guard that is horizontally oriented and removably connected at the front and/or rear ends of a machine frame. In some embodiments, bumpers can support other machine components. For example, in some embodiments, a heat exchanger can be mounted to an upper surface of a bumper. An exemplary bumper is disclosed on page 8 of Product Brochure AEHQ6134 that published in March, 2011 ("the product brochure").

Although the bumper disclosed in the product brochure may provide collision protection for the associated machine, it may also be problematic in some applications. In particular, when a heat exchanger is mounted directly to an upper surface of the exemplary bumper, an air flow passing across the upper surface and through a lower portion of the heat exchanger may become turbulent, due to a buildup of friction between the air flow and the upper surface. This turbulence may reduce an effectiveness of the heat exchanger under some conditions.

The disclosed bumper is directed to overcoming one or more of the problems set forth above and/or other problems of the prior art.

SUMMARY

In one aspect, the present disclosure is directed to a bumper assembly. The bumper assembly may include a heat exchanger, and a bumper configured to support the heat exchanger. The bumper may have a recess formed in an upper surface and located to provide a clearance space around a lower portion of the heat exchanger.

In another aspect, the present disclosure is directed to a bumper. This bumper may include an upper plate having a first leading edge, a first trailing edge located opposite the first leading edge, and a first pair of leg portions extending from the first trailing edge. The bumper may also include a lower plate spaced apart from the upper plate and having a second leading edge, a second trailing edge, and a second pair of leg portions extending from the second trailing edge. The bumper may further include a plurality of intermediate walls connecting the upper plate and the lower plate, and a recess formed with the upper plate between the first leading edge and the first trailing edge. The recess may extend in a transverse direction between the first pair of leg portions.

DETAILED DESCRIPTION

Figure 1:
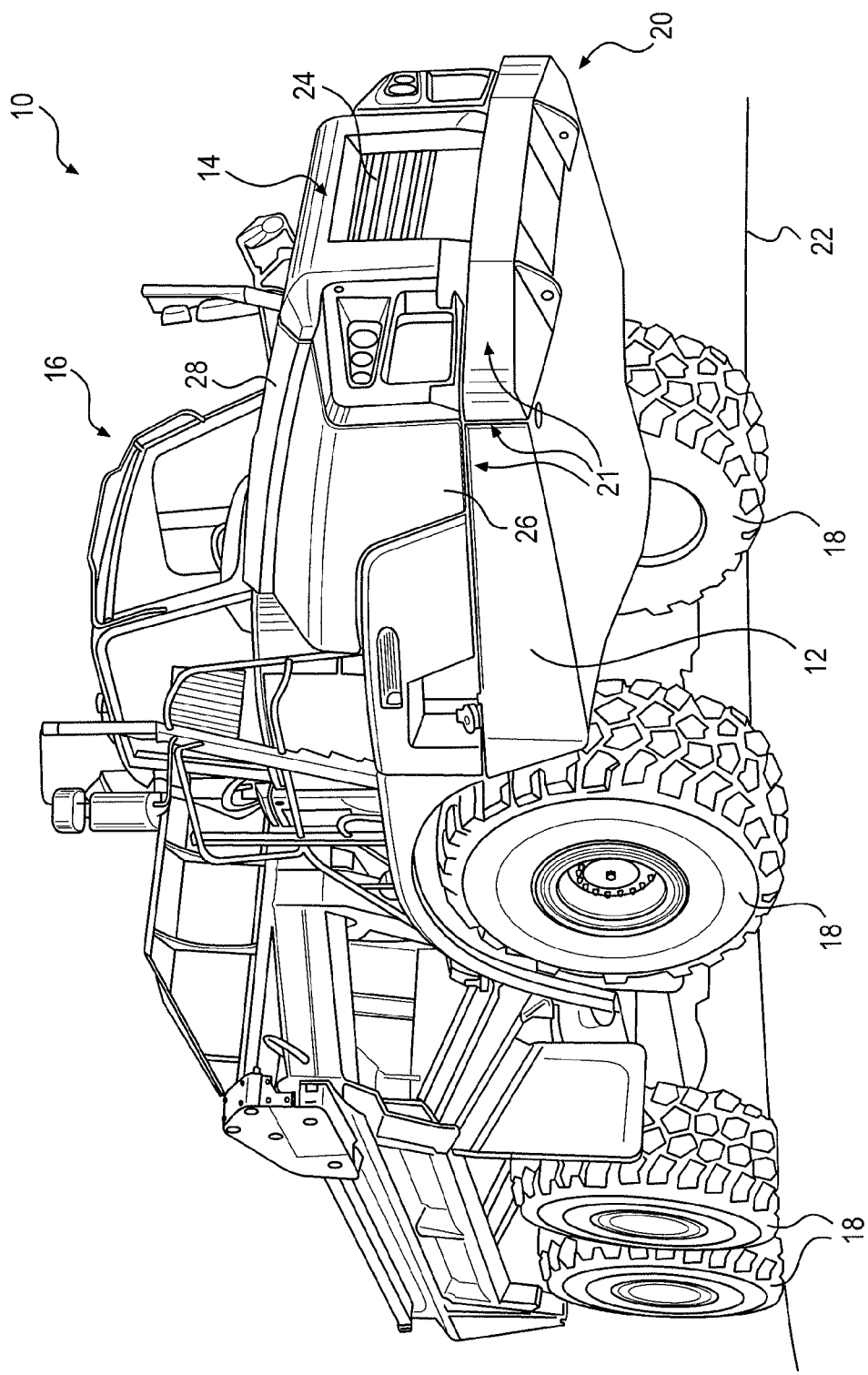
FIG. 1 is a pictorial illustration of a machine having an exemplary bumper assembly.

FIG. 1 illustrates an exemplary embodiment of a machine 10. Machine 10 may be a mobile machine that performs some type of operation associated with an industry such as mining, construction, farming, or another industry known in the art. For example, machine 10 may be an earth moving machine such as an articulated haul truck (shown in FIG. 1), an on- or off-highway mining truck, a wheel loader, or a motor grader. Machine 10 may include a machine frame 12 that supports a power source 14 and an operator station 16. Machine 10 may also include a plurality of traction devices 18 that are rotationally connected to machine frame 12 and driven by power source 14 to propel machine 10, and a bumper assembly 20 connectable to a front end of machine frame 12 (or another support structure of machine 10).

Power source 14 may be a combustion engine, for example a diesel-fueled compression-ignition type of engine. An output from power source 14 may be directed to traction devices 18 to cause traction devices 18 to propel machine 10. In the disclosed embodiment, power source 14 is disposed within an engine enclosure 21 that is located forward of (relative to a primary travel direction of machine 10) and nearer to a ground surface 22 than operator station 16. In the disclosed embodiment, enclosure 21 generally includes a front grill 24, opposing side walls 26, and a hood 28. Hood 28 may slope downward from operator station 16 toward front grill 24 to provide enhanced viewing of ground surface 22 for an operator of machine 10. It should be noted that the location and configuration of enclosure 21 is exemplary only, and other configurations may alternatively be utilized in connection with machine 10.

Operator station 16 may be an onboard location from which an operator of machine 10 observes performance of machine 10 and provides instructions for controlling machine 10. In the disclosed example, operator station 16 is a substantially enclosed structure supported by frame 12 that includes one or more interface devices located proximate an operator seat (not shown). It is contemplated, however, that operator station 16 may alternatively be a generally open platform, if desired, and may or may not include a seat (i.e., the operator may be required to stand during control of machine 10).

Traction devices 18 may embody wheels located at each side of machine 10. For example, four traction devices 18 (two on each side) may be located toward a rear-end of machine 10 and arranged in left and right pairs, while two traction devices 18 may be located toward a front-end of machine. Any of front and rear traction devices 18 may be driven and/or steered, as desired. It is also contemplated that one or all of traction devices 18 may be replaced with another type of traction device, if desired, such as tracks or belts.

Figure 2:
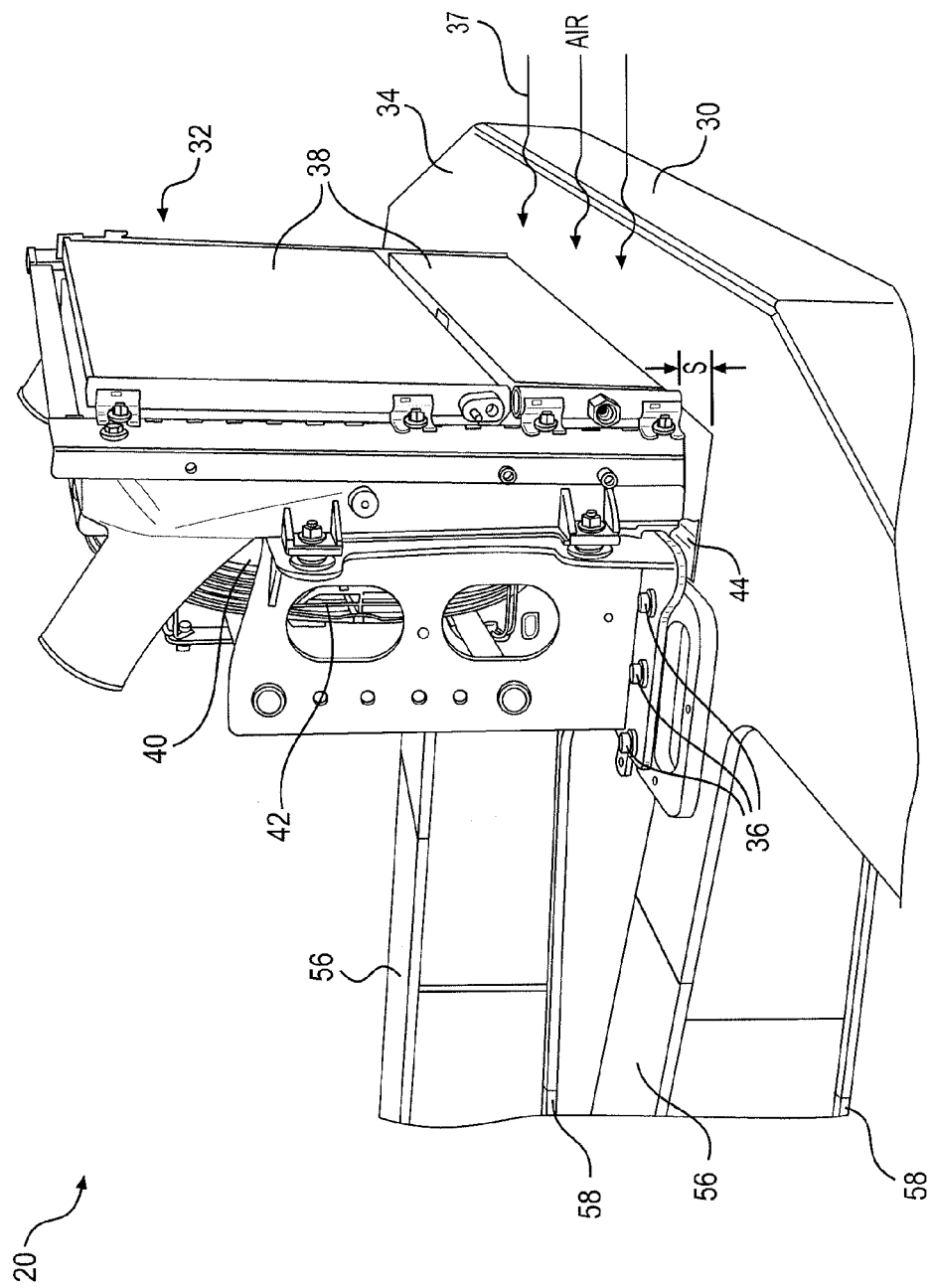
FIG. 2 is a pictorial illustration of the bumper assembly of FIG. 1.

As shown in FIG. 2, bumper assembly 20 may include, among other things, a bumper 30 and one or more components of machine 10 removably connected to bumper 30. In the depicted example, a heat exchanger package 32 is removably connected to an upper surface 34 of bumper 30 by way of a plurality of fasteners 36 located at transverse sides of heat exchanger package 32 (relative to an air flow direction 37). It is contemplated that additional components may be removably connected to bumper 30, if desired, such as one or more tanks (e.g., air tanks, hydraulic tanks, fuel tanks, etc.). The additional components may be connected to upper surface 34 or any other surface of bumper 30 that satisfies needs of the particular components. For example, the one or more tanks may be situated inside of bumper 30 and/or between bumper 30 and frame 12 to protect the tanks from external damage.

Heat exchanger package 32 may consist of at least one heat exchanger 38 (two shown in FIG. 2), a fan shroud 40, and a fan 42. Heat exchanger 38 may be located forward of fan 42, and fan shroud may substantially surround fan 42. Heat exchanger 38, fan shroud 40, and fan 42 may be connected to each other, such that heat exchanger 38 is cantilevered over upper surface 34 of bumper 30 by fasteners 36. Heat exchanger package 32 may be located at a leading end of power source 14 and configured to cool power source 14 by heat transfer between engine coolant and air drawn through heat exchanger 38 by fan 42.

In the disclosed embodiment, heat exchanger 38 may be recessed within upper surface 34. In particular, a recess 44 may be formed within upper surface 34 to provide clearance for heat exchanger 38. In addition to allowing heat exchanger 38 to ride lower (i.e., closer to ground surface 22—see FIG. 1), recess 44 may also allow for a clearance space S to exist between an upper surface of bumper 30 and a lower portion of heat exchanger 38. The lowered configuration of heat exchanger 38 may allow for hood 28 to ride lower at the front end of machine 10, thereby improving the operators view from operator station 16. The space S between bumper 30 and the lower portion of heat exchanger 38 may allow for better air flow through heat exchanger 38. In particular, the flow of air passing through the lower portion of heat exchanger 38 may not flow close enough to upper surface 34 to create turbulence-causing friction. Likewise, the air flow across the upper surface 34 of bumper 30 may not hit an abrupt stop at the edge of heat exchanger 38, which would normally generate turbulence at the entrance to heat exchanger 38. A decreased turbulence in this airflow may increase an amount of air passing through heat exchanger 38, particularly through the lower portion (i.e., the portion nearest bumper 30) of heat exchanger 38. In one embodiment, the space S may be about 15-50 mm.

Figure 3:
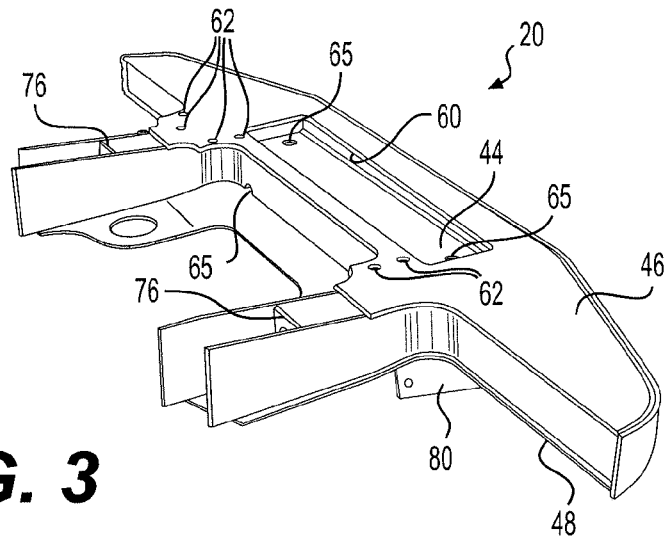
FIG. 3 is a pictorial illustration of a bumper that may be included in the bumper assembly of FIG. 2.
Figure 4:
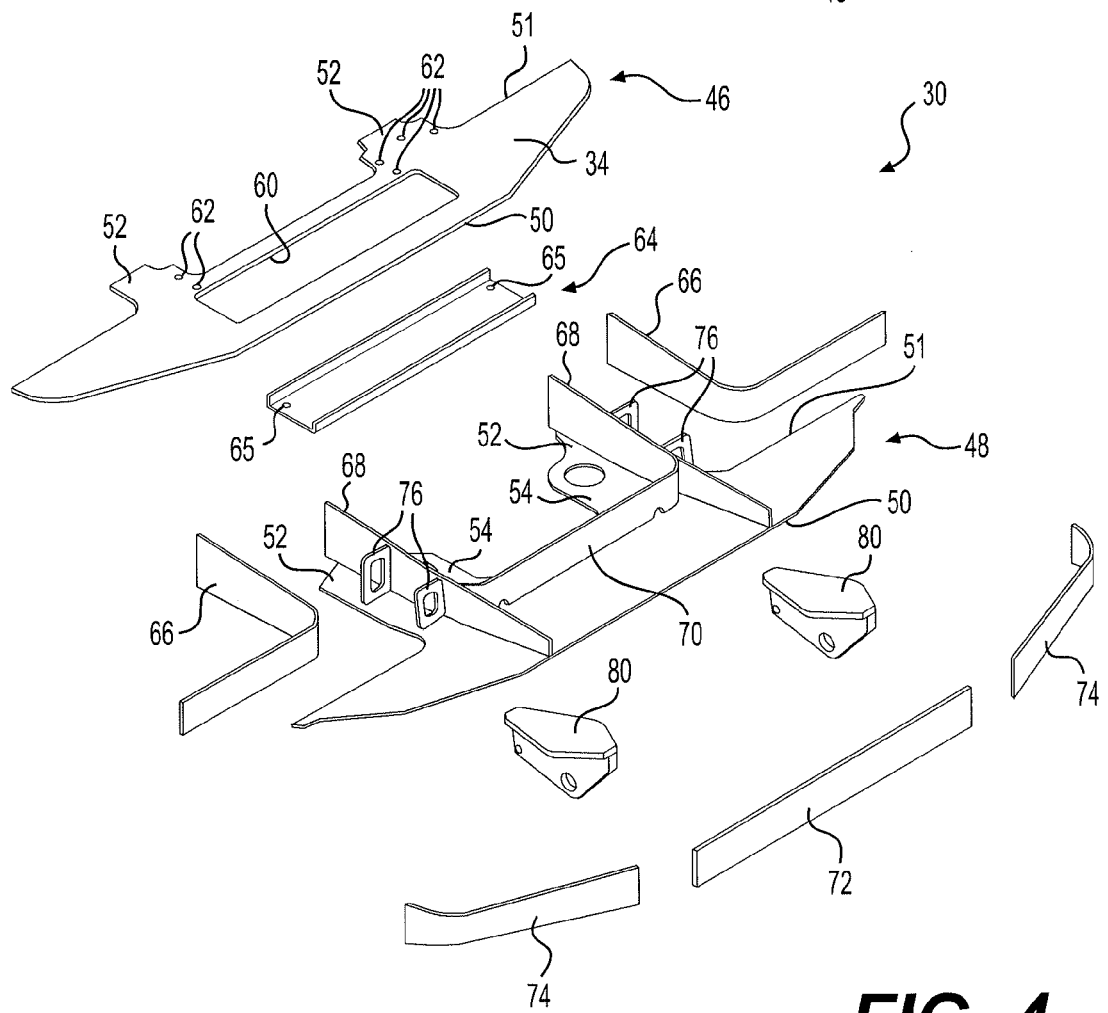
FIG. 4 is an exploded view pictorial illustration of the bumper of FIG. 3.

As shown in FIGS. 3 and 4, bumper 30 may be a welded structure formed from a plurality of different parts. These parts may include, among other things, an upper plate 46 having upper surface 34 formed thereon, a lower plate 48 that is spaced apart from upper plate 46, and a plurality of intermediate walls oriented generally orthogonal to upper and lower plates 46, 48 and disposed therebetween. Upper and lower plates 46, 48 may each include a generally arcuate leading edge 50, a generally straight trailing edge 51 located opposite leading edge 50, and a pair of leg portions 52 extending from trailing edge 51. Leg portions 52 of lower plate 48 may be shaped differently from leg portions 52 of upper plate 46, and include inwardly extending protrusions 54 that are configured accommodate mounting of power source 14 (e.g., to receive vibration isolation bushings associated with power source 14). Leg portions 52 may be transversely spaced apart from each other to generally align with upper and lower plates 56, 58 of frame 12 (referring to FIG. 2). In the disclosed embodiment, leg portions 52 of upper plate 46 may be shorter than leg portions 52 of lower plate 48. As will be described in more detail below, this difference in lengths may facilitate an overlapping welded connection between bumper 30 and frame 12.

Upper plate 46 may have an opening 60 that provides clearance to recess 44 (referring to FIG. 2), and a plurality of threaded bores 62 that are configured to receive fasteners 36. A tray 64 may form a bottom surface of recess 44 and extend transversely between leg portions 52. One or more drain holes 65 may be associated with recess 44 (e.g., passing through tray 64) to facilitate the draining of any precipitation collected within recess 44.

The plurality of intermediate walls disposed between upper and lower plates 46, 48 may include, among other things, first and second outer walls 66, first and second inner walls 68, an inner end wall 70, an outer end wall 72, and first and second outer curved walls 74. First and second outer walls 66 may be generally L-shaped, and face-bent to conform to similar edge geometry of upper and lower plates 46, 48 that connects trailing edge 51 with leg portions 52. First and second inner walls 68 may be oriented generally parallel to first and second outer walls 66 and, together with first and second outer walls 66 and upper and lower plates 46, 48, form generally hollow box-like structures at leg portions 52. In some embodiments, one or more support webs 76 may be disposed within the box-like structures to increase a strength of bumper 30. First and second inner walls 68 may also form end walls for recess 44 (referring to FIG. 2). Inner end wall 70 may transversely connect first and second inner walls 68 at trailing edge 51 of upper and lower plates 46, 48, between leg portions 52. Outer end wall 72 may be located generally opposite inner end wall 70 at leading edge 50, connect to ends of first and second inner walls 68, and connect at its lengthwise ends to first and second outer curved walls 74. First and second outer curved walls 74 may connect at their remaining distal ends to first and second outer walls 66. In the disclosed embodiment, each of these parts may be fabricated from sheet stock of about the same material and thickness, and connected to each other via welding. It is contemplated, however, that one or more of the parts may alternatively be fabricated from another material and/or connected to the remaining parts in another manner, if desired. It is also contemplated that some of the walls described above may have different geometry, different configurations, and/or join to each other in different ways, if desired. For example, first and second inner walls 68 could alternatively be integrally formed with inner end wall 70 (i.e., bent to form a general U-shape), if desired. In this configuration, additional wall components could then be connected to the corners of the U-shape and used to form the ends of end walls for recess 44.

In the disclosed embodiment, bumper 30 may also include one or more tow features 80 mounted to a bottom surface of lower plate 48. Tow features 80 may be welded to lower plate 48, and allow for tethering of machine 10 to another machine or worksite feature.

INDUSTRIAL APPLICABILITY

The disclosed bumper assembly may be applicable to any mobile machine where collision protection and enhanced cooling of the machine is desired. The disclosed bumper assembly may provide collision protection by extending a sacrificial distance from the front end of machine 10. The disclosed bumper assembly may provide for enhanced cooling by decreasing airflow turbulence at the mounting location of an associated heat exchanger.

Bumper 30 may be connected to frame 12 by way of welding. In particular, bumper 30, having its constituent parts previously sub-assembled and welded together, may be positioned at the front end of frame 12. Upper plate 46 may be generally aligned both vertically and horizontally with upper plate 56 of frame 12 at leg portions 52, while lower plate 48 may be generally aligned both vertically and horizontally with lower plate 58 of frame 12. All seams associated with the abutment of these components may then be welded. The overlapping nature of these seams (i.e., the fact that upper plate 46 of bumper 30 may connect to frame 12 at a different fore/aft location relative to lower plate 48) may increase a vertical support strength of bumper 30.

It will be apparent to those skilled in the art that various modifications and variations can be made to the disclosed bumper assembly without departing from the scope of the disclosure. Other embodiments of the bumper assembly will be apparent to those skilled in the art from consideration of the specification and practice of the hitch assembly disclosed herein. It is intended that the specification and examples be considered as exemplary only, with a true scope being indicated by the following claims and their equivalents.

What is claimed is:

1. A bumper assembly, comprising:
   a heat exchanger; and
   a bumper configured to support the heat exchanger, the bumper having a recess formed in an upper surface to provide a clearance space for the heat exchanger, the clearance space located around a lower portion of the heat exchanger.

2. The bumper assembly of claim 1, wherein the bumper includes:
   an upper plate having a first leading edge, a first trailing edge located opposite the first leading edge, and a first pair of leg portions extending from the first trailing edge;
   a lower plate spaced apart from the upper plate and having a second leading edge, a second trailing edge, and a second pair of leg portions extending from the second trailing edge; and
   a plurality of intermediate walls connecting the upper plate and the lower plate,
   wherein the recess is formed with the upper plate between the first leading edge and the first trailing edge, and extends in a transverse direction between the first pair of leg portions.

3. The bumper assembly of claim 2, wherein the first pair of leg portions extends a different distance from the first trailing edge than the second pair of leg portions extend from the second trailing edge.

4. The bumper assembly of claim 3, wherein the first and second leading edges are generally arcuate.

5. The bumper assembly of claim 3, wherein the first and second pairs of leg portions are configured to be welded to a machine frame in generally vertical and horizontal alignment with upper and lower plates of the machine frame.

6. The bumper assembly of claim 5, wherein the upper plate, lower plate, and plurality of intermediate walls form generally hollow box-like structures.

7. The bumper assembly of claim 5, wherein the lower plate includes protrusion connected to the first pair of legs and extending inward to receive power source mounting.

8. The bumper assembly of claim 5, further including at least one tow feature connected to a bottom surface of the lower plate.

9. The bumper assembly of claim 1, wherein the clearance space is about 15-50 mm.

10. The bumper assembly of claim 1, wherein the heat exchanger is cantilevered over the recess.

11. The bumper assembly of claim 10, wherein the heat exchanger is connected to the bumper by way of a fan shroud.

12. The bumper assembly of claim 11, wherein the fan shroud is connected to the upper surface of the bumper by way of a plurality of fasteners located at transverse sides of the fan shroud relative to a flow direction through the heat exchanger and fan shroud.

13. A bumper, comprising:
    an upper plate having a first leading edge, a first trailing edge located opposite the first leading edge, and a first pair of leg portions extending from the first trailing edge;
    a lower plate spaced apart from the upper plate and having a second leading edge, a second trailing edge, and a second pair of leg portions extending from the second trailing edge;
    a plurality of intermediate walls connecting the upper plate and the lower plate; and
    a recess formed with the upper plate between the first leading edge and the first trailing edge, the recess extending in a transverse direction between the first pair of leg portions.

14. The bumper of claim 13, wherein the first pair of leg portions extends a different distance from the first trailing edge than the second pair of leg portions extend from the second trailing edge.

15. The bumper of claim 14, wherein the first and second leading edges are generally arcuate.

16. The bumper of claim 14, wherein the first and second pairs of leg portions are configured to be welded to a machine frame in generally vertical and horizontal alignment with upper and lower plates of the machine frame.

17. The bumper of claim 16, wherein the upper plate, lower plate, and plurality of intermediate walls form generally hollow box-like structures.

18. The bumper of claim 13, further including at least one tow feature connected to a bottom surface of the lower plate.

19. The bumper of claim 13, wherein the lower plate includes protrusion connected to the first pair of legs and extending inward to receive power source mounting.

20. A machine, comprising:
    a frame;
    a plurality of traction devices rotationally supporting the frame;
    a power source supported by the frame and configured to drive the plurality of traction devices;
    a heat exchanger package located at a leading end of the power source and configured to cool the power source; and
    a bumper connected to the frame and configured to mount the heat exchanger package, the bumper having a recess formed in an upper surface at the heat exchanger package,
    wherein:
       the heat exchanger package is cantilevered over the recess; and
       a clearance space is maintained between a bottom surface of the recess and the heat exchanger package.

* * * * *